United States Patent [19]

Koenig

[11] 4,233,729
[45] Nov. 18, 1980

[54] APPARATUS AND METHODS FOR MAKING AND USING SLOT CLOSURE WEDGES AT A COIL INJECTION STATION

[75] Inventor: Fredrick Koenig, Fort Wayne, Ind.

[73] Assignee: General Electric Company, Fort Wayne, Ind.

[21] Appl. No.: 964,076

[22] Filed: Nov. 27, 1978

[51] Int. Cl.³ .......................................... H02K 15/10
[52] U.S. Cl. .................................. 29/596; 29/564.6; 29/564.8; 29/734; 493/360; 493/442
[58] Field of Search ............. 29/596, 734, 736, 564.6, 29/564.8; 93/1 R, 84 R, 84 FF

[56] References Cited

U.S. PATENT DOCUMENTS

| | | | |
|---|---|---|---|
| 3,324,536 | 6/1967 | Hill | 29/734 |
| 3,447,225 | 6/1969 | Eminger | 29/734 |
| 3,579,818 | 5/1971 | Arnold et al. | 29/596 |
| 3,626,432 | 12/1971 | Fohl | 29/734 |
| 3,758,937 | 9/1973 | Ott | 29/734 |
| 3,805,357 | 4/1974 | Peters | 29/734 |
| 3,829,953 | 8/1974 | Laner et al. | 29/596 |
| 3,831,255 | 8/1974 | Smith et al. | 93/1 R |
| 3,872,568 | 3/1975 | Morr | 29/734 |
| 3,909,902 | 10/1975 | Peters | 29/734 |
| 4,136,433 | 1/1979 | Copeland et al. | 29/564.6 |

OTHER PUBLICATIONS

MPC Publication, S/N, 8-3652-1.

*Primary Examiner*—Carl E. Hall
*Attorney, Agent, or Firm*—Ralph E. Krisher, Jr.

[57] ABSTRACT

Apparatus includes pinch wheels that both advance wedge material stock and also substantially permanently form the stock material to precise dimensional tolerances by reducing the material thickness; means by which the formed material is retained in the formed configuration thereof; wedge severing means; and means for loading severed wedges into a wedge magazine. One of the pinch wheels is driven through a clutch-brake system arranged so that it may be driven unidirectionally only from a reciprocating drive arm. The wedges have precisely controlled dimensional tolerances and dimensional stability, with the result that the wedges lie squarely in stator core slots (when the wedges are inserted into such slots), and "wire over wedge" problems associated with skewed wedges in stator core slots are overcome.

11 Claims, 5 Drawing Figures

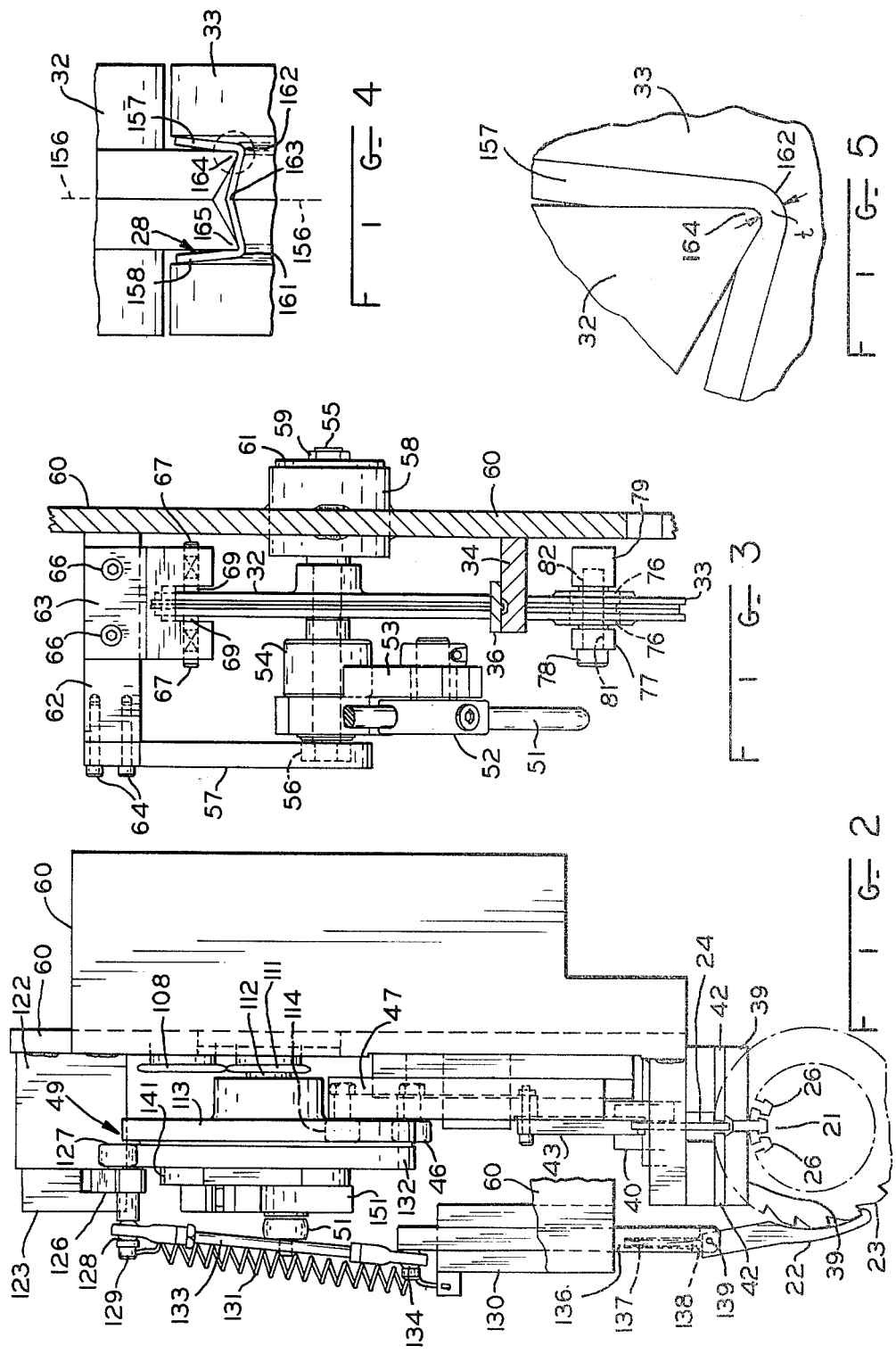

APPARATUS AND METHODS FOR MAKING AND USING SLOT CLOSURE WEDGES AT A COIL INJECTION STATION

CROSS REFERENCE TO RELATED APPLICATION

The subject matter of this application is related to application Ser. No. 964,075 which is assigned to the same assignee as this application, which was fileed on the same day as this application, and which was filed in the name of Louis W. Pieper.

BACKGROUND OF THE INVENTION

The present invention relates generally to apparatus and methods for making slot closure wedges for magnetic stator cores at a station where coils and wedges are axially injected into axial slots of such cores; and more particularly where such wedges are formed into a desired shape by rollers and fed by pinch roller action to a wedge cutting mechanism adjacent to a wedge magazine that is disposed generally collinearly with axially extending coil injection tools.

Numerous patents in the art illustrate methods and apparatus wherein wedges are made in a wedge maker, placed in a wedge magazine disposed generally collinear with axially extending coil injection blades or tools, and wherein the wedges subsequently are inserted axially into stator core slots along the trailing ends of stator coils that are also being axially inserted into such slots. The wedges then lie between side turn portions of the slots and the stator bore, and sometimes lie adjacent the bore and effectively "close" such slots. Morr U.S. Pat. No. 3,872,568 which issued Mar. 25, 1975 is one patent which illustrates an arrangement as just described, and further general background information is supplied at lines 1-50 of column 1 of this patent, the entire disclosure of which is incorporated herein by reference.

Another patent (the entire disclosure of which is also incorporated herein by reference) which pertains to this art is Eminger U.S. Pat. No. 3,447,225 which issued June 3, 1969. This particular patent recognizes a problem that has become known in the art as the "wire over wedge" problem. This particular problem has continued to trouble the industry, and the inventions described in the present application are intended, among other things, to solve this problem.

Still other patents that illustrate apparatus of the type to which the present invention may be applied are Hill U.S. Pat. No. 3,324,536 of June 13, 1967; Lauer et al U.S. Pat. No. 3,829,953 of Aug. 20, 1974; Arnold et al patent 3,579,818 of May 25, 1971; and Smith et al U.S. Pat. No. 3,831,255 of Aug. 27, 1974; the entire disclosures of all of which are incorporated herein by reference.

Apparatus embodying the present invention in one preferred form differs from the prior art mentioned herein-above at least in that wedge material is selectively fed by a pinch wheel arrangement that serves both as a feeding mechanism and as a means for forming wedge material into a predetermined shape, and in that the wedge material is substantially immediately thereafter severed into individual wedges and then inserted into a wedge magazine. Shortly thereafter, e.g., within one machine injection cycle, the wedges are axially placed in core slots.

Peters U.S. Pat. No. 3,805,357 of Apr. 23, 1974 illustrates a pinch wheel feed arrangement for stator core wedge material which is formed into wedges by a wedge forming die spaced from the pinch wheel feed mechanism. Peters U.S. Pat. No. 3,909,902 of Oct. 7, 1975 also shows a pinch wheel feed mechanism for insulating material (best seen in FIG. 5 of the patent), but in the context of a non-analogous ground insulation cell inserting machine rather than a wedge maker; Ott U.S. Pat. No. 3,758,937 of Sept. 18, 1973 shows a pinch wheel fed wedge inserter for the non-analogous armature art.

Machine Products Corporation of Dayton, Ohio has sold, more than a year prior to this application, a pinch wheel fed stator wedge maker which forms wedges which ultimately are placed in slots of cores that have previously had windings placed therein; and Lakes Engineering of Bluffton, Indiana has, more than a year prior to the filing date of this application, sold what is known as a "hot former mylar wedge maker". However, the two machines just mentioned are sold for making wedges per se, and the present invention is directed to the solution of problems encountered in apparatus of the type wherein wedge making and wedge insertion is accomplished with the same equipment that is utilized for stator coil "injection" (or "placing" as it is sometimes called in the art).

In the prior art equipment of the type where wedge making and insertion mechanisms are combined with coil injection mechanisms; the wedge material most typically is advanced with a "hitch" feed as shown for example in FIG. 2 of the above referenced U.S. Pat. No. 3,579,818. Moreover, in equipment of this combined function type, the wedges themselves are formd by dies which include a die movable transversely to the direction in which the wedge material is being fed. Very often, such movable die also places the wedge in the wedge magazine. The wedges so made are placed in a magazine and then, as winding sideturn portions of coils are moved from the tooling of the combined function equipment and axially into axially extending slots of a stator core, the wedges are axially advanced immediately behind the winding side turn portions. It is intended, with all such equipment, that all of the side turn portions being inserted in a given slot be positioned "under" the following wedge being placed in the same slot. In other words, none of such winding turn portions (or segments thereof) should be "over" the wedge and thus lie between the wedge and the bore of the stator.

However, experience has shown that the wire over wedge problem has persisted, despite efforts to overcome the problem. Moreover, the wedge material feeding and forming apparatus of the prior art machines has been relatively complex and thus relatively difficult to make and maintain, and especially so when provision must be made for "skipping" predetermined wedges.

It thus should be understood that it would be desirable to provide new and improved combined function methods and apparatus for wedge making and inserting and coil injecting that overcome the above-mentioned problems.

Accordingly, it is an object of the present invention to provide new and improved methods and apparatus for making and inserting stator core wedges, and for inserting windings into axially extending slots of a stator core that open into an axially extending bore.

A more specific object of the present invention is to provide apparatus and methods whereby wedges are precisely dimensioned, and substantially immediately placed in a wedge storage magazine and placed in slots of a core without relaxation of the wedge dimensions, whereby wire over wedge problems are alleviated.

Still another object of the invention is to provide new and improved apparatus and methods that satisfy the objects stated hereinabove, and yet wherein the manufacture of wedges may be performed or omitted in preselected patterns.

SUMMARY OF THE INVENTION

In carrying out the above and other objects of the present invention, improved apparatus is provided which, in one preferred form, includes means that both advance wedge material stock and also substantially permanently form the stock material to precise dimensional tolerances; means by which the formed material is retained in the formed configuration thereof; wedge severing means; and means for loading severed wedges into a wedge magazine. In one form of apparatus, the wedge magazine comprises the lower tooling of a coil injection machine and forms, in effect, an extension of tool gaps that accommodate winding coils in a coil injection machine. However, the magazine receiving the wedges may be a short term storage magazine which in turn feeds the wedges to a wedge magazine that forms the lower tooling of a coil injection machine. Thus, embodiments of the present invention are of primary use and benefit in multifunction machines. "Multifunction machines" is meant to denote machines that perform the multiple functions of: making wedges for stator cores, inserting coils of winding turns into stator cores, and placing the wedges in at least selected slots of a stator core.

The means that both advance wedge material stock and also substantially permanently forms the stock material preferably comprise a pair of pinch wheels or rollers that pinch the stock therebetween at preselected times in order to feed wedge material. One of the wheels is driven through a clutch-brake system arranged so that it may be driven unidirectionally only from a reciprocating dirve arm. The other wheel is supported so that it may be selectively urged toward the first wheel in order to pinch and feed wedge stock material. In addition, the wheels or rollers are contoured and dimensioned so that wedge material being rolled therebetween will be formed into a desired configuration. The forming of the wedge material by the wheels results in wedges having precisely controlled dimensional tolerances and dimensional stability, with the result that the wedges lie squarely in stator core slots (when the wedges are inserted into such slots), and "wire over wedge" problems associated with skewed wedges in stator core slots are overcome. In this regard, it should be understood that wire over wedge problems can be aggravated when non-symmetrical wedges, e.g., wedges having legs of unequal length or legs bent at different angles are positioned in stator core slots which have symmetrical interior walls and/or tooth tips relative to a centerline passing generally radially along the slot. This problem results since a non-symmetrical wedge will tend to "twist" as it moves to its final position in the slot, and one or more wire segments may become positioned "over" the wedge (i.e., become positioned between the wedge and the bore of the core).

The subject matter which I regard as may invention is particularly pointed out and distinctly claimed in the concluding portion of this specification. The invention itself, however, taken with further objects and advantages thereof, may be best understood by reference to the following description taken in conjunction with the accompanying drawings.

DESCRIPTION OF THE DRAWINGS

FIG. 2 is a view taken in the direction of lines 2—2 in FIG. 1, but wherein some parts are removed and some parts are broken away for clarity of illustration;

FIG. 3 is a view taken in the direction of lines 3—3 in FIG. 1, but wherein parts are removed and broken away to promote clarity of illustration;

FIG. 4 is an enlarged view of a portion of the pinch feed and forming wheels shown in FIGS. 1-3; and FIG. 5 is an enlarged view of a portion of the structure denoted by a broken line circle in FIG. 4.

DESCRIPTION OF THE PREFERRED EMBODIMENT

Figure 1:
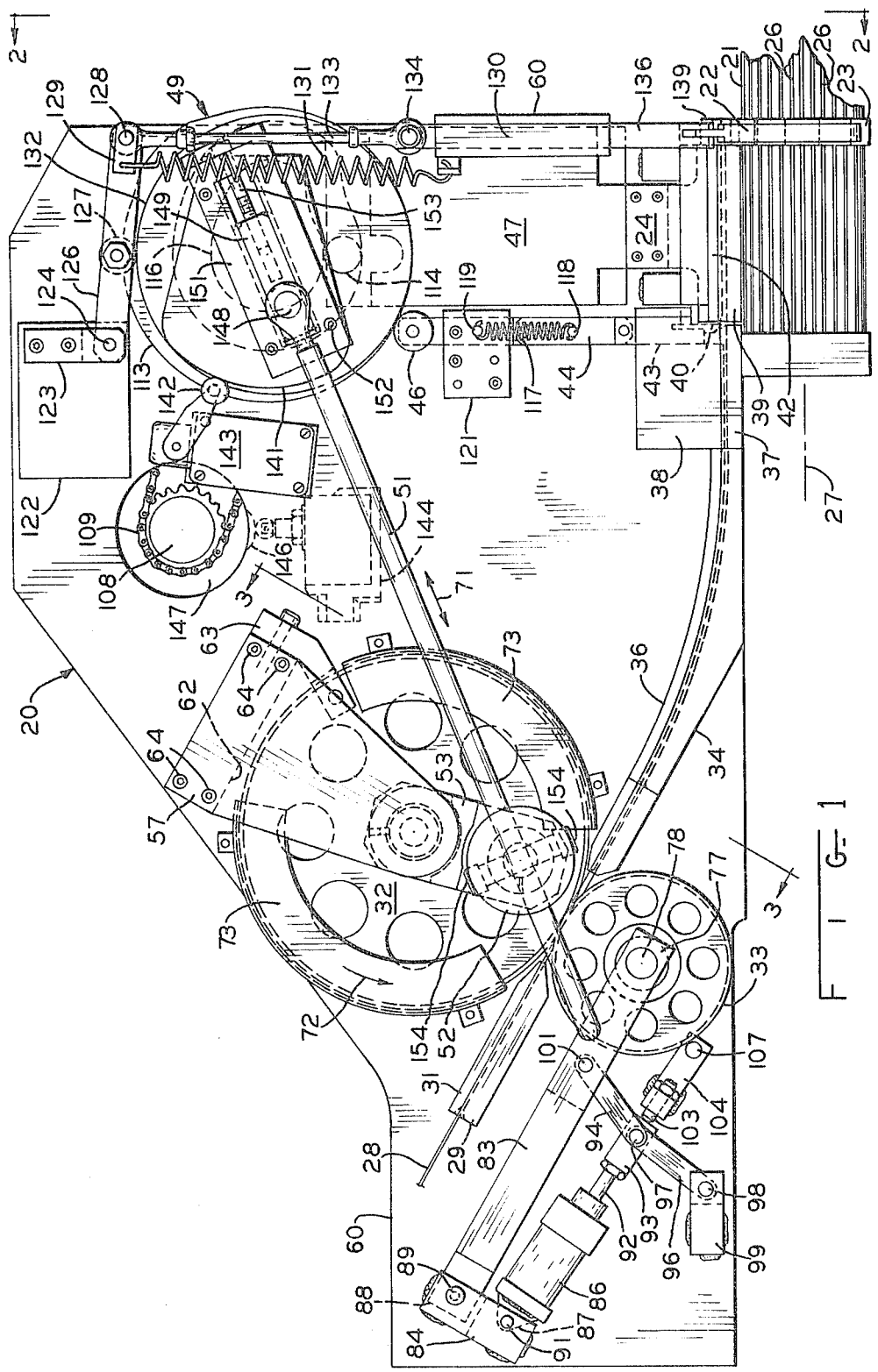
FIG. 1 is a side elevation, with parts removed, parts in section, and parts broken away, of a wedge making, and wedge and coil injection machine particularly adapted for use in the manufacture of dynamoelectric machine stators.

Referring now to the drawings, and particularly to FIG. 1, a multifunction machine 20 has been illustrated which is a wedge making and wedge and coil injection machine of the type shown in the above referenced Lauer et al U.S. Pat. No. 3,829,953; Morr U.S. Pat. No. 3,872,568; Eminger U.S. Pat. No. 3,447,225; Hill U.S. Pat. No. 3,324,536; and so on. For clarity of illustration, portions of the apparatus 20 not necessary for an understanding of the present improvements have been omitted, but the relationship of the structure actually shown in FIGS. 1 and 3 hereof to the not shown parts of apparatus 20 can be readily appreciated by comparing the structure shown in FIGS. 1 and 2 herein with the disclosures in the above referenced patents. For example, the wedge magazine 21, hook 22, and ratchet teeth 23 shown in FIGS. 1 and 2 correspond with the hook or ratchet mechanism 104, ratchet teeth 23, and wedge magazine 96 shown in FIG. 6 of Eminger U.S. Pat. No. 3,447,225. Other similarities between Eminger's "slot wedge forming and loading apparatus 113" and the corresponding structure shown by applicant will also of course be appreciated by persons of ordinary skill in the art. One of the differences between Eminger's arrangement and that of FIG. 1 herein which should be emphasized is that wedges are "formed" by Eminger's "punch member 170", while the blade 24 used herein only pushes wedges into slots 26 of the magazine 22, because the wedges themselves are "formed" by a forming and feeding pinch wheel arrangement described in more detail hereinbelow. It is also noted that, while the ratchet teeth 23 and pawl or hook 22 is shown at the lower end of the wedge magazine 21 in FIG. 1; the ratchet mechanism could just as well be located at the upper end of the magazine 21 in the manner described at lines 24-34 in column 3 of the referenced Hill U.S. Pat. No. 3,324,536.

Although the patents to Eminger and Hill have just been specifically referred to, it will be understood that the relationship of the structure illustrated by the drawings herein is also related to the structures illustrated in the other hereinabove referenced patents. For example, the correspondence between the "wedge maker 112", "wedge magazine 86" and "index ratchet 92" of Morr U.S. Pat. No. 3,872,568; the "wedge magazine 220", "ratchet plate 212", and "pawl 214" (hook) of Arnold et al U.S. Pat. No. 3,579,818; and the wedge magazine 21, ratchet teeth 23, and hook or pawl 22, all as shown herein, is self-evident.

With more specific reference now to FIG. 1 herein, it is noted that although the specific orientation of the apparatus there shown relative to a horizontal plane is not critical; in preferred exemplifications the rotational axis 27 of the magazine 21 (and thus the central longitudinal axis of the not shown coil injection tooling) is oriented at approximately forty to forty-five degrees relative to horizontal (a relative orientation similar to this is shown in FIG. 1 of Fohl U.S. Pat. No. 3,626,432 of Dec. 7, 1971). However, the apparatus 20 has been oriented in FIG. 1 with the magazine and tooling oriented horizontally in order to illustrate the apparatus to as large a scale as possible.

Strip insulating material 28, which typically is a polyester material, is fed into the apparatus 20 from the left as viewed in FIG. 1. The polyester material suitable for use as insulating material in dynamoelectric machine stator cores is sold under various trade names. However, material that has been utilized while practicing the present invention has been material sold commercially by the E. I. DuPont de Nemours and Company as Mylar insulating material. As is well known, Mylar material is a polyester material known as polyethylene terephthalate.

The material 28 is pulled into a track established by a guide 29 and a cover 31 by the co-action of an upper forming roller 32 and a lower forming roller 33. Although the term "roller" will be used herein to describe the elements 32 and 33, it should be understood that other terminology such as a "forming wheel" or "pinch wheel" could also be utilized.

The material 28 is formed to have a predetermined configuration having precise dimensional characteristics that are determined by the peripheral contours of the forming or pinch rollers 32, 33. The insulating material so formed then is pushed by the rollers along another trackway that is defined by the guide 34 and cover 36. The guide 36 and cover 34 in turn terminate at a stationary guide area defined by a lower plate 37 and upper cover 38. It will be understood that the cover 38 and guide 37 also define a trackway or pathway having a cross-sectional configuration corresponding to the desired configuration of the insulating material which was established by the forming rollers 32, 33. Continued operation of the forming rollers 32, 33 cause the formed insulating material to advance from between the cover 38 and guide 37 and move to the end of a track that is established by a lower guide plate 39 (best seen in FIG. 2) and a pair of spacer plates 41 (also best seen in FIG. 2).

As will be best appreciated from an inspection of FIG. 2, the guide plate 39 and spacer plates 42 also are formed to have a cross-sectional configuration which will accept the previously formed insulating strip material.

The apparatus 20 operates so that the preformed strip material is advanced beyond the end of the trackway defined by the cover 38 and guide 37 a distance generally corresponding to the axial length or height of the stator core into which the insulating material 28 is to be inserted in the form of discrete individual wedges. The end of the trackway defined by cover 38 and guide 37 defines the active location of a cutoff mechanism which includes a cutoff blade 42 (see FIG. 2), a blade carrier 43, and blade actuating arm 44 to the end of which is fastened a cam follower 46. The cutoff mechanism just described is known in the art and formed part of the basic apparatus 20 before it was modified to embody the present invention. However, the various guides 29, 34, 37 and guide plates 39 are novel in the apparatus 20 as are the covers 31, 36, 38, and spacers 42 to the extent that they define a trackway that is formed to have a shape that corresponds to the shape of the formed insulating strip material 28. Before being modified to embody features of this invention, the feeding mechanism for the apparatus 20 was quite similar to that shown in FIG. 2 of the above-referenced Arnold et al U.S. Pat. No. 3,579,818. In the Arnold patent, a hitch feed mechanism was utilized to feed insulating material while in a flat configuration past the cutoff mechanism at which time the flat material was cut off and then inserted into the wedge magazine 21. The insertion mechanism of the apparatus 20 is not modified from the prior art and thus the inserter slide 47, and inserter blade 24 shown herein have been known and used (prior to the present invention) in the same form that they appear in the drawings. Thus, in summary, novel modifications of the apparatus 20 so that it would embody the present invention include the provision of the forming rollers 32, 33 (along with their associated control and drive mechanisms), and the specially configured trackway defined by the covers 36, 38 and guides 34, 37.

The drive for the forming roller 32 as derived from a cam assembly generally denoted by the reference numeral 49. The frive from the cam assembly is then applied through arm 51 to a wrist pin 52 and thence to an arm 53. The arm 53 in turn is tied to a clutch 54, best seen in FIG. 3, and the clutch then rotates shaft 55 to which upper forming roller 32 is keyed for rotation. As best revealed in FIG. 3, the shaft 55 is supported for rotation by a bearing 56 carried by a mounting plate 57 and a bearing which is carried in a bearing retainer 58. The bearing retainer 58 in turn is supported by main frame member 58 and a lock nut 59 and bearing retainer washer 61 cooperate to hold the shaft 55 in the desired assembled relationship with the mounting plate 57 and main frame member 60.

With continued reference to FIG. 3; a support bracket 62 is welded at one end thereof to main frame member 60. The bracket 62 serves to support a braking means that includes brake bracket 63, and also to support the previously mentioned mounting plate 57 which is fastened thereto by screws 64. The brake bracket 63 is fastened by screws 66 to bracket 62, and is bifurcated as illustrated so as to straddle a portion of upper roller 32. The bifurcated portions of bracket 63 are bored and tapped as illustrated so as to accommodate two socket head cap screws 67, a pair of springs 68, and a pair of brake plugs or pads 69. The springs 68 are trapped between the screws 67 an plugs 69, with the result that the plugs 69 are spring biased against opposite faces of roller 32. The plugs 69 thus continuously frictionally engage roller 32 and apply a braking force thereto. While any suitable material may be used to make brake plugs 69, satisfactory results have been obtained by using plugs made from Textolite material (marketed under that name by the General Electric Company) that were 9.53 mm long ($\frac{3}{8}$ inch) and 7.92 mm (0.312 inches) in diameter.

The function of the just described braking means is to insure that upper forming roller 32 will not move except when it is being positively driven by clutch 54.

Clutch 54 was a purchased FORMSPRAG clutch model FSR5 having a bore of 15.88 mm (0.625 inches), and left hand rotation. This clutch transmits driving power to shaft 55 only when driven in one direction, and slips when driving power tending to cause reverse rotation is applied thereto. Thus, with reference to FIG. 1, as arm 51 reciprocates as indicated by arrows 71, roller 32 will intermittently rotate in the direction indicated by arrow 72, with the reciprocating or oscillating motion of arm 51 being converted to periodic rotary motion by means of wrist pin 52, arm 53. and one-way clutch 54. For purposes of safety, guards 73 are provided around upper roller 32, although the use of such guards would usually be optional.

With reference now to FIG. 3, lower forming roller 33 is rotatably supported on a pair of bearings 76 which in turn are supported by a cap screw 78. The screw 78 passes through a bore 81 in a bifurcation 77 and is retained by threads in a tapped portion 82 of a bifurcation 79. Actually, the bifurcations are bifurcated portions of a lower pulley supporting arm 83, as will be evident from a comparison of FIGS. 3 and 1.

As best revealed in FIG. 1, a bifurcated mounting block 84 is welded to main frame member 60; and one end 88 of arm 83 as well as one end 87 of a hydraulic cylinder 86 are secured in the bifurcation of block 84 by pivot pins 89,91. The rod 92 of cylinder 86 is threaded into a tubular adapter 93, and adapter 93 in turn is pivotally connected with first ends of two links 94, 96 by means of a pin 97. Since the other end of link 96 is supported on a fixed pivot pin 98 carried by a bifurcated block 99 welded to frame 60; and the other end of link 94 is pivotally connected to the bifurcated end of arm 83 at 101; a toggle linkage is provided whereby arm 83 will move lower forming roller 33 toward and away from upper forming roller 32 in response to movement of cylinder rod 92.

Thus, when rod 92 retracts, arm 83 will swing downwardly (at least as viewed in FIG. 1) roller 33 will move away from roller 32, and material 28 will not be pinched between the two rollers. Because of this, a segment of material 28 will not be advanced from guide 29 to guide 34 even though roller 32 is rotated. Thus, cylinder 86 is useful for determining whether or not a wedge will actually be placed in any given slot 26 (see FIG. 2) of wedge magazine 21. Furthermore, cylinder 86, in conjunction with adjustable stop means 102, will determine the degree of proximity with which roller 33 will be held to roller 32. This degree of proximity in turn will determine how tightly a given thickness of material 28 will be pinched between the two rollers and is particularly advantageously for reasons enumerated hereinbelow.

It will be appreciated that the illustrated adjustable stop means 102 comprises a socket head cap screw 103 threaded into block 104 and jam or lock nut 106. The block 104 is securely fixed to frame 20, e.g., by welds or screws; and when welded as shown, it is preferred that a locating dowel 107 be used to insure proper location of the block on frame member 60. With the arrangement just described, screw 103 may be extended or retracted in order to limit the length of travel of rod 92, and thus determine the degree of expansion of the toggle linkage, all as should now be fully understood.

With reference now to FIG. 2 in conjunction with FIG. 1, the operation of the wedge inserter mechanism and wedge cut-off mechanism, wedge magazine ratcheting mechanism, and wedge maker driving mechanism, (all of which have been known by others prior to the present invention) will be explained.

Motive power for the cam assembly 49 is supplied from a drive sprocket 108 mounted on a hydraulic motor (see FIG. 1) through a chain 109 to a driven sprocket 111 (see FIG. 2). As will be best understood from FIG. 2, the sprocket 111 is keyed or otherwise fastened to a cam shaft 112 which is drivingly connected with the cam assembly 49 which includes a number of cams that rotate together.

The cam assembly 49 in turn includes a face cam 113 which drives cam follower 114 and thereby controls the movement of the inserter slide 47 to which inserter blade 24 is attached. As the cam 113 rotates for one revolution, the follower 114 rides in track 116, and blade 24 undergoes one reciprocation. The blade thus acts to transfer to a wedge magazine slot 26 any severed wedge positioned in the path of travel of the blade 24.

The cam follower 46, forming part of the wedge cut-off mechanism, is constrained to follow the outer peripheral cam surface of cam 113 (see FIG. 1) by the action of tension spring 117 which is stretched between a retainer 118 on actuating arm 44 and a retainer 119 mounted on guide block 121. Thus, one revolution of cam 113 will cause one reciprocation of cut-off blade 42, and any wedge segment positioned under the cut-off blade will be severed.

With reference now again to FIG. 2, a mounting block 122, welded to frame 60, has bolted thereto a pivot plate 123. The plate 123 in turn pivotally supports, at pivot 124, a link assembly 126 (see FIG. 1) which carries a cam follower 127 and a ball joint 128 to which a spring holder 129 is attached. A tension spring 131 is stretched between the spring holder 129 and a slide bar support 130 which is held in a stationary position by reason of its attachment (by welding, bolting, etc.) to part of the frame 60 (see FIG. 1). With this arrangement, the cam follower 127 is constantly urged downwardly against the outer peripheral surface of cam 132 which forms part of the cam assembly 49. One revolution of the cam assembly 49 causes one reciprocation of link assembly 127 and the rotary advancement of wedge magazine 23 an amount equivalent to the spacing between adjacent slots 26 (see FIG. 2).

As will be understood from FIG. 2, a link 133 is connected to the ball joint 128 and a lower ball joint 134 carried on the upper end of a slide bar 136 which is constrained to move up and down in a linear path by the slide bar support 130. The lower end of slide bar 136 is bifurcated (see FIG. 1) and bored to receive a compression spring 137 and button 138 (see FIG. 2). The pawl or hook 22 is held in the bifurcated end of the slide bar by dowel pin 139, and the pawl serves as a retainer for the button 138 and spring 137.

In view of the foregoing, it will be understood that the pawl 22 and teeth 23 (of the wedge magazine) coact to form a wedge advancing ratchet mechanism as the link assembly 126 (see FIG. 1) drives the link 133, slide bar 136, and pawl hook 22.

Cam 141 also forms part of the cam assembly 49, and this cam drives a cam follower 142 which periodically activates a limit switch 143. A cam similar to cam 141 could be provided to actuate a limit switch similar to limit switch 143 so that the limit switch could close just prior to the time that arm 51 starts to advance roller 32 in the direction of arrow 72. The signal from such switch then could be fed to a control circuit which, as will be understood by persons skilled in the art, would be programmed to determine the "pattern" of wedges desired.

If the wedge that would otherwise be made is to be "skipped" or omitted, the control circuit then would cause hydraulic cylinder 86 to retract and collapse toggle links 94. This in turn would withdraw roller 33 and disable advancement of wedge material 28 for that particular subcycle of the equipment. Thus, a cam and limit switch could provide a signal as to "when" toggle links 94 should be collapsed, while the general controller for the apparatus would determine "whether" the links should collapse and thus "skip" a wedge. On the other hand, any of the wedge pattern controllers currently used in the industry to "skip" a wedge by disabling a wedge material feeding mechanism (e.g., a "hitch feed"), could be used to control the condition of cylinder 86.

In the apparatus illustrated in FIG. 1, the cam 141 and limit switch 143 are actually used to indicate a "safe to inject" condition of the wedge maker. In other words, the cam follower 142 will be on the high lobe of cam 141 only during the time that inserter blade 24 (see FIG. 2) is not in an interfering relation with a slot of the wedge magazine 21.

A limit switch 144 is triggered by a lobe 146 on cam 147 once during each revolution of sprocket 108 (and thus once each revolution of cam assembly 49), and the switch 144 thus provides a signal each time the wedge magazine 21 is advanced one slot or "step". This signal is then utilized in the counter portion of the main control which is used to establish the number of wedges actually made in a given wedge making cycle. This signal of course also could be used when determining which wedges are to be "skipped". The main control of course is used to disable the wedge maker once the magazine 21 is loaded (i.e., once it has been advanced 24 slots if it contains 24 slots, etc.).

Although the apparatus illustrated herein has been described in conjunction with a wedge magazine that forms the lower part of the tooling package for the equipment, it is to be understood that the wedge feeder and maker described herein could also be used to load wedges into a wedge transfer magazine from whence a full set of wedges would be virtually simultaneously transferred into a magazine such as magazine 21 (which forms part of the tooling package of a coil injection machine).

The reciprocating driving action imparted to arm 51 is derived from the rotary motion of cam assembly 49 by means of a slider mechanism that includes a pivot pin 148 carried by slider 149, and guide block 151 which is fastened to cam 141 by means of four socket heat cap screws 152. During one complete revolution of cam assembly 49, arm 51 will undergo one reciprocation, and the upper forming roller 32 will be driven in the direction of arrow 72 while arm 51 moves toward the right (as viewed in FIG. 11). On the other hand, due to the type of clutch used and the previously described brake (clutch 54, brake plugs 69, see FIG. 3), roller 32 will remain stationary during that part of the reciprocation that arm 51 is moving to the left (as viewed in FIG. 1). The slider 149 is held in fixed relation to guide block 151 during normal operation of the apparatus by socket head cap screw 153. Thus, slider 149 does not normally move relative to guide block 151. However, when it is desired to change the length of wedges being produced, the position of slider 149 within the slot of guide block 151 is adjusted by turning screw 153 and this in turn adjusts the distance between the center of pin 148 and the center of cam assembly 49. In this manner, the effective "crank arm" dimension of the slider mechanism is changed, thus causing a proportional change in the actual amount of rotation of roller 32 during each "wedge material advance" operation of roller 32. Of course, prior to adjustment of screw 153, screws 154 in wrist pin 52 are loosened temporarily so that the effective length of arm 51 will also be adjusted. A close inspection of FIG. 1 will reveal that screw 153 is threaded into slider 149, and that the head of screw 153 is trapped by a cap portion of guide block 151 so that axial movement between screw 153 and guide block 151 is prevented (although rotation of screw 153 relative to guide block 151 is permitted).

With reference now to FIGS. 4 and 5, some of the advantages of using the illustrated apparatus will be described. With initial reference to FIG. 4, the rollers 32, 33 co-act to pinch together the strip material and form (i.e., permanently stress) the strip material at predetermined regions so that it will assume a predetermined desired cross-section configuration or shape as shown in FIG. 4. More specifically, this shape is symmetrical relative to the central reference plane 156, with the legs 157, 158 being of the same length within close dimensional tolerances (as compared to shapes formed merely by the action of a blade and die at a wedge magazine loading station as shown, for example, in FIG. 2 of the above-referenced Arnold et al U.S. Pat. No. 3,579,818 or in FIG. 6 of the above-referenced Eminger U.S. Pat. No. 3,447,225).

The precise dimensional tolerances of the wedge material shape shown in FIG. 4 is attained because the guide 29 of FIG. 1 is accurately aligned with rollers 32, 33 to insure that the material 28 will be transversely centered relative to the reference plane 56 shown in FIG. 4. Since the strip material 28 is tightly pinched between the rollers 32, 33, the material 28 continues to be centered relative to the plane 156 as it is deformed and permanently stressed by the pinching action of the rollers.

It was mentioned hereinabove that the expanding action of the toggle links 94 (shown in FIG. 1) was adjustable in order to control the degree of proximity of the rollers 32, 33. It has now been determined that the rollers 32 and 33 should be positioned sufficiently close to one another so that the strip material is permanently stressed by reducing its dimension in the vicinity of the corners 161, 162. In addition, the roller 33 is crowned relative to the reference plane 156 so that the central portion 163 of the wedge material 28 is stressed.

The dimensions of the rollers 32 and 33 may be closely established by conventional machining and manufacturing methods and, thus, the location of the portions of the rollers that establish the corners 161, 162 of the wedge material can be precisely established (within normal machining tolerances). Satisfactory results have been obtained using the apparatus illustrated herein when producing wedges from MYLAR material having a thickness of about 0.355 mm (0.014 inches) when the proximity between rollers 32 and 33 has been adjusted so that the final reduced dimension of the MYLAR material at the corners 161, 162 had a reduced thickness dimension t (see FIG. 5) of about 0.254 mm (0.010 inches). Once the wedge material has been deformed at the corners 161, 162 as just described, the location of the corners is essentially permanently established. Thus, when the wedge material is severed and inserted as inividual wedges into the wedge magazine, symmetry of the wedges relative to the reference plane 156 is assured and continuing symmetry of the wedges as they are inserted into stator core slots is assured. It is believed that this assured symmetrical configuration of the wedges substantially contributes to avoidance of the wire over wedge problems discussed hereinabove in the section of this application identified as the background for the present invention.

It should be understood that materials obtained from different sources which are to be used as wedge material, and that materials of initial dimensions other than that described hereinabove for the material 28, may require adjustment of adjusting screw 103 (see FIG. 1) so that the degree of proximity of the rollers 32 and 33 will be adjusted accordingly. In other words, while suitable results have been obtained by establishing the dimension t as approximately a 29% reduction from the initial thickness of the strip material 28 (when it is MYLAR material of the thickness mentioned) other percent reductions in thickness may be more optimum for materials of different thicknesses or for materials obtained from other sources. The apparatus shown herein insures that simple and rapid adjustment may be made to the equipment in order to insure continued high volume production usage of the equipment without being burdened by continuing wire over wedge problems.

With reference particularly to FIGS. 4 and 5, it will be noted that the corners 164, 165 of roller 32 are radiused slightly. The exact dimension of such radius (and the corresponding radiused portions of roller 33) are not critical, and those parts of the rollers are radiused simply to insure that sharp corners are not provided which might cut through the insulating strip material and actually sever it rather than merely compress and reduce the dimension of the material at the compression point.

While the present invention has been explained by describing a preferred embodiment thereof, and some modification thereto, it should be apparent that many modifications may be made when actually putting the invention into practice without departing from the spirit of the invention. It is therefore intended to cover all such equivalent variations as come within the scope of the appended claims.

I claim:

1. In a method of making wedges in a multi-function, stator wedge making and inserting, and stator winding injecting apparatus, wherein the apparatus includes means for severing wedge material from an indeterminate amount of supply of such material having a predetermined and generally uniform thickness, in order to establish pieces of wedge material of a determinate length, wherein the apparatus includes a wedge magazine having a plurality of locations for receiving the pieces of wedge material of a determinate length, and wherein the apparatus further includes means for transferring the pieces of wedge material of a determinate length into the wedge magazine; and wherein the method comprises: pinching wedge material between two roller members and advancing a predetermined length of the material from the material supply toward the means for transferring, while also reducing the thickness of the wedge material at preselected locations where the material is being pinched and thereby forming the wedge material into a predetermined symmetrical shape having a central portion and two leg portions with the junctures and dimensions of the leg portions and the central portion being accurately defined by reduced thickness segments of the wedge material that are established by said pinching of the wedge material; severing the same predetermined length of previously pinched wedge material with the means for severing to establish a wedge of finite length; transferring the severed predetermined length of previously pinched wedge material to the wedge magazine; and subsequently transferring part of at least one stator winding and said wedge of finite length into a slot of a stator core with said multifunction stator wedge making and inserting and stator winding injecting apparatus; the improvement comprising: confining the pinched wedge material in a guide having a shape to insure retention of said symmetrical shape by the wedge material as it is advanced from the roller members to the means for severing.

2. The method of claim 1 wherein the step of pinching comprises gripping wedge material between a pair of spaced apart rollers that jointly define the extent of deformation and extent of thickness reduction of the wedge material.

3. The method of claim 2 wherein the wedge of finite length is of the predetermined symmetry after transfer to the wedge magazine.

4. The method of claim 2 wherein the improvement further comprises selectively separating the spaced apart rollers in order to inhibit advancing wedge material during a wedge making sub-cycle of the apparatus whereby a wedge is skipped and at least one of the wedge magazine locations for receiving a piece of wedge material is kept void of wedge material.

5. The method of claim 1 wherein the improvement further comprises constantly exerting a force for retarding rotational movement of one of the roller members, and periodically overcoming the retarding force and thereby advancing the roller members in order to advance a finite length of pinched wedge material.

6. In multifunction stator wedge making and inserting and stator winding injecting apparatus having means for moving a strip of wedge material adjacent to wedge material severing means, magazine means for receiving wedges severed from the strip of wedge material, and means for moving severed wedges into the magazine means, the improvement wherein: said means for moving a strip of wedge material comprises pinch wheel means for feeding wedge material to said severing means and for pinching wedge material and for permanently reducing the thickness of the wedge material at preselected locations, and thereby deforming the wedge material into a predetermined configuration; said apparatus includes a mechanism for controlling the operation of the pinch wheel means; and said apparatus further includes guide means extending from the pinch wheel means to the severing means, said guide means being configured to retain the wedge material in generally said predetermined configuration as it moves from the pinch wheel means to the severing means.

7. The invention of claim 6 wherein the apparatus further comprises adjustable drive means for the pinch wheel means whereby the length of material fed during operational periods of the pinch wheel means may be varied.

8. The invention of claim 6 wherein the apparatus further includes brake means arranged for applying a constant restraint against movement of the pinch wheel means.

9. The invention of claim 6 wherein said pinch wheel means includes two wheels movable in close proximity to each other and said mechanism for controlling the operation of the pinch wheel means includes a toggle linkage interconnected with one of said two wheels and operable for determining the position of said one of the wheels relative to the other of the wheels.

10. The invention of claim 6 wherein the apparatus further includes a drive mechanism for moving the wedge magazine, and wherein motive power for driving the pinch wheel means is derived from said drive mechanism.

11. The invention of claim 6 wherein the apparatus includes a drive mechanism for supplying motive power to said means for moving severed wedges into the the wedge magazine, and wherein motive power for the pinch wheel means is derived from said drive mechanism.

* * * * *